United States Patent Office 2,806,889
Patented Sept. 17, 1957

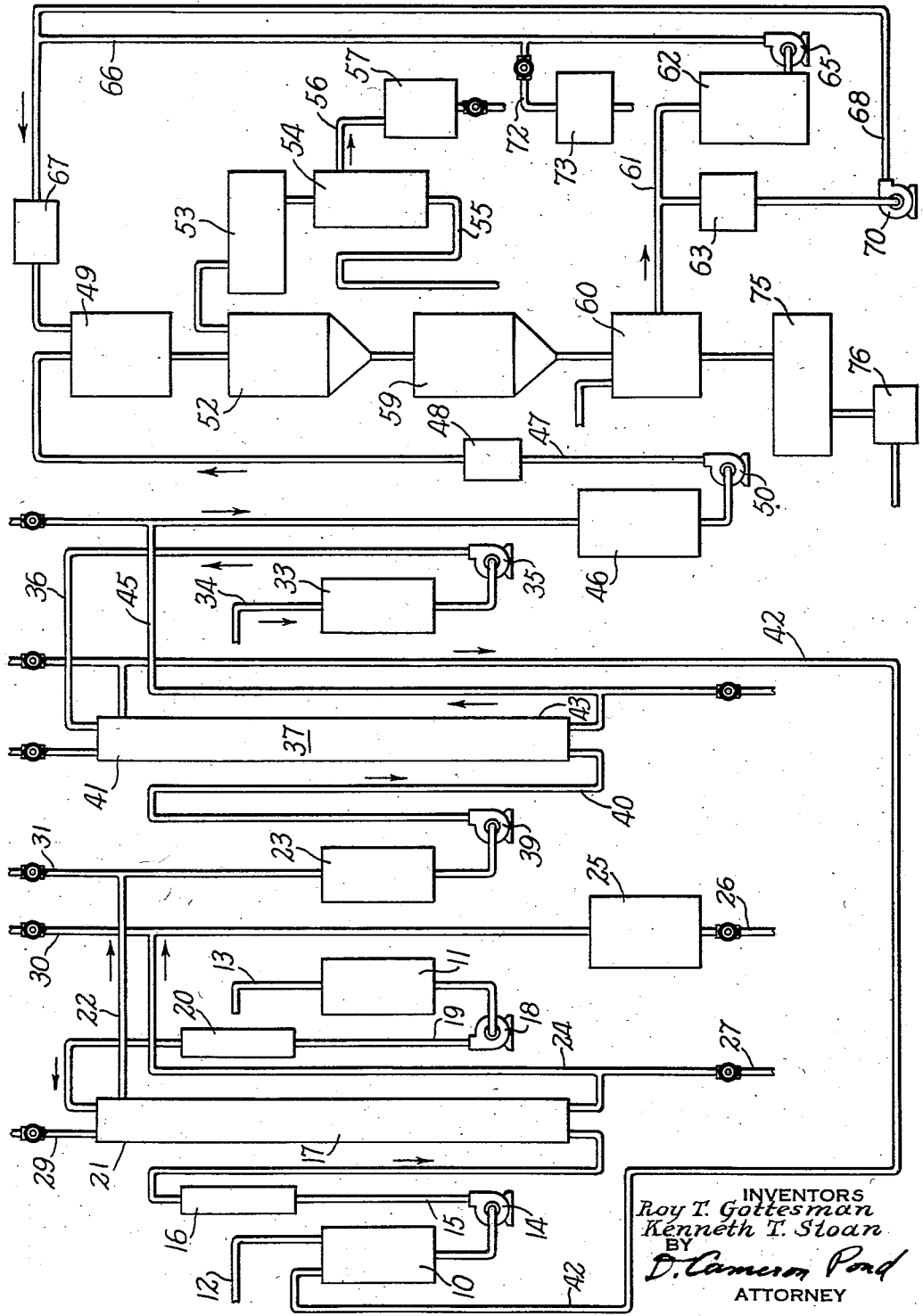

2,806,889
RECOVERY OF TRIMETHYLOLETHANE

Roy T. Gottesman, Clifton, and Kenneth T. Sloan, Garfield, N. J., assignors to Heyden Newport Chemical Corporation, a corporation of Delaware Application May 20, 1954, Serial No. 431,214

7 Claims. (Cl. 260—637)

The present invention relates to a novel process for recovering trimethylolethane from aqueous solutions containing, in addition to trimethylolethane, sodium formate and other impurities formed during the production of the trihydroxy alcohol, and is concerned with obtaining a quality product in high yield and substantially free of impurities.

Trimethylolethane is produced by the condensation of formaldehyde with propionaldehyde under alkaline conditions and in the presence of a strongly alkaline material, such as alkali metal hydroxide. Customarily, the reaction is carried out in aqueous medium and may be considered as proceeding as follows:

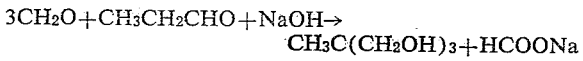

$$3CH_2O + CH_3CH_2CHO + NaOH \rightarrow CH_3C(CH_2OH)_3 + HCOONa$$

From this reaction it can be seen that one mole of sodium hydroxide is required for the condensation of each mole of propionaldehyde. Some excess sodium hydroxide is desirable to maintain the reaction mixture alkaline, and from 1.01 to 1.4 moles of sodium hydroxide are preferably present for each mole of propionaldehyde. Obviously other molar ratios may be used. Higher yields also are obtained if more than three moles of formaldehyde indicated by the reaction, are present. For example, up to 3.75 moles of formaldehyde may be used for each mole of propionaldehyde. The aqueous reaction liquor contains, in addition to the trimethylolethane product, a large quantity of alkali metal formate, and also impurities produced by various side reactions in addition to the excess formaldehyde and sodium hydroxide. Preferably, the sodium hydroxide in the reaction liquor is neutralized with acid prior to recovering the trimethylolethane. Formic acid may be used for this purpose to convert all of the excess hydroxide to the formate.

Trimethylolethane is highly soluble in water and it is very difficult, if not impossible, to crystallize trimethylolethane satisfactorily from aqueous reaction liquors. The trimethylolethane is not obtained in a sufficiently high yield or in a satisfactory degree of purity. Many other procedures have been proposed in the prior art for recovering trimethylolethane, including extraction of the reaction liquor with a solvent such as acetone, iso-propanol, dioxane or the like. In general, such procedures are costly and are not satisfactory for producing pure trimethylolethane on a commercial scale.

In accordance with the present invention, trimethylolethane is extracted from the reaction liquor or its equivalent with a particular solvent to separate the trimethylolethane from a large portion of the sodium formate and, to a certain extent, from the other impurities present. During this extraction, a solvent phase forms containing the trimethylolethane plus a relatively smaller amount of impurities, and an aqueous raffinate phase separates containing a relatively larger amount of impurities, particularly the sodium formate. The trimethylolethane is then extracted from the solvent extract with fresh water and the stripped solvent is recycled for use in extracting a further quantity of reaction liquor. The aqueous re-extract is concentrated and then cooled to precipitate crystalline trimethylolethane, which can be readily separated from the mother liquor in a relatively pure condition. A major portion of the separated mother liquor is recycled for subsequent mixture with an additional portion of fresh aqueous re-extract prior to isolating additional trimethylolethane. Trimethylolethane is sufficiently soluble in water so that the initial percentage of recovery from a quantity of aqueous solution is too low to be practical. It has been discovered that by recycling a major portion of the mother liquor from the crystallization step, the percentage of recovery can be raised sufficiently to be commercially feasible, providing a portion of the mother liquor is discarded to prevent undue build-up of impurities.

Only a few solvents have been found which may be used satisfactorily in the present process. The solvent must be sufficiently insoluble in water to maintain the loss in the raffinate low enough to be practical. On the other hand, the solvent must be sufficiently miscible with or soluble in water to remove the trimethylolethane. It has been discovered that the solvent should be selected from the group consisting of amyl alcohols and normal butanol or mixtures thereof, with the preferred solvent being a mixture of secondary amyl alcohols or a mixture of primary and secondary amyl alcohols. Water is relatively soluble in the other butyl alcohols, with the result that if a significant quantity of a butyl alcohol other than normal butyl alcohol is used, the solvent extract will contain sufficient water and dissolved sodium formate to lower the quality of the end product and also there will be an undue loss of solvent in the raffinate. While normal butanol can be used alone, it preferably is used with amyl alcohol as water is more soluble in normal butanol than is desirable. Solvents such as acetone, ethyl acetate and iso-propanol cannot be used.

When extracting the reaction liquor with the solvent, it is necessary to use a larger quantity of solvent than reaction liquor to sufficiently extract the trimethylolethane. While the reaction liquor in its normal state and containing, for example, about 10% by weight of trimethylolethane may be used, the reaction liquor is preferably concentrated at least to a specific gravity of 1.15 at 25° C. to reduce the amount of solvent required and to reduce the amount of solvent lost in the aqueous raffinate. If the reaction liquor is too highly concentrated the solvent extract will contain a large amount of sodium formate and there will be a tendency for the trimethylolethane product to have a high ash content. Accordingly, we prefer to concentrate the reaction liquor to a specific gravity within the range of 1.15 to 1.22 at 25° C. which corresponds to a trimethylolethane content in the range of about 20% to 32%. The optimum degree of concentration will vary depending upon the quantity of impurities present and the solvent used. Some concentration is desirable from the standpoint of economy, while too high a concentration tends to reduce the quality of the product. Obviously, higher concentrations may be used where the required quality permits. As used herein, the term "reaction liquor" covers the reaction liquor without regard to concentrations unless so stated. If as a result of concentration some of the formate precipitates, it preferably is removed by filtration prior to the extraction.

The present process and its advantages will become more readily apparent when considered with the accompanying drawing, which schematically shows a flow diagram of the present process, it being understood that the present invention is not limited to any particular form of apparatus.

Referring to the accompanying drawing and prior to placing the system in operation, the solvent reservoir 10 is filled with solvent and the reservoir 11 is filled with trimethylolethane reaction liquor. Solvent may be continuously or intermittently fed to reservoir 10 through conduit 12 from a suitable source and reaction liquor may be continuously or intermittently fed into reservoir 11 through conduit 13 which is connected to a suitable source of supply. Solvent is continuously fed by pump 14 through conduit 15 and preheater 16 to the bottom of extraction column 17. At the same time, reaction liquor is continuously fed by pump 18 through conduit 19 and preheater 20 to the top of column 17. The column is preferably packed with glass rings or other packing so that as the incoming reaction liquor flows downwardly and the incoming solvent flows upwardly through the column, the two liquids are comingled and intimately mixed so that the solvent will efficiently dissolve the trimethylolethane. The solvent bubbling up through the reaction liquor dissolves the trimethylolethane and collects in a layer or solvent extract phase in the calming section 21 at the top of column 17 from which the solvent extract continuously flows through conduit 22 to the solvent extract reservoir 23. The aqueous phase or raffinate which is rich in impurities continuously flows from the lower portion of column 17 through conduit 24 to the raffinate receiver 25 which is provided with a valved outlet 26 connected to a sewer or other place of disposal. The bottom of column 17 is provided with a valved outlet 27 for draining the column. The column, the solvent extract receiver 23 and the raffinate receiver 25 are provided with valved vents 29, 30 and 31 respectively.

While the preheaters 16 and 20 may be eliminated, they are preferably used to warm the incoming fluids and increase the amount of trimethylolethane dissolved by the solvent. Preferably, the temperature of the solvent is in the range of 60–75° C. with the optimum temperature being about 70° C. However, other temperatures may be used. Normally, reaction liquor and solvent are continuously fed into the extraction column and solvent extract and raffinate are continuously withdrawn from the column.

Preferably the amount of solvent fed to the column is greater on a weight basis than the quantity of reaction liquor as the trimethylolethane is less soluble in the solvent than in the water. The optimum ratio of solvent to reaction liquor depends upon the concentration of the reaction liquor, temperature of the solvent and the amount of impurities present. Good results have been obtained when using from 1.5 to 2.5 parts by weight of solvent to one part by weight of reaction liquor, with the preferred ratio being in the range of 1.9 to 2.2 parts of solvent to one part of reaction liquor. The ratio of solvent to reaction liquor is primarily a matter of economy. With a lower ratio, the solvent does not remove the trimethylolethane completely and the loss of trimethylolethane in the raffinate will run high. If a higher ratio is used, more water is subsequently required for re-extraction and this is undesirable because of the increased cost.

Prior to placing the system in operation, fresh water reservoir tank 33 is filled through conduit 34 connected to a suitable source of fresh water. Connection 34 also is utilized for continuously or intermittently supplying fresh water to the reservoir 33 as required. Fresh water is pumped from reservoir 33 by pump 35 through conduit 36 to the top of second extraction column 37 which is filled with glass rings or other suitable packing. Initially, extraction column 37 is approximately filled with water. Then pump 39 is started to pump solvent extract from tank 23 through loop 40 and into the lower portion of the extraction column 37. The incoming solvent extract bubbles up thorugh the water in column 37 and collects as a solvent phase in the upper calming section 41 of the column. As soon as the column is in equilibrium, stripped solvent flows from section 41 through conduit 42 back to solvent reservoir 10 for use in extracting a further quantity of reaction liquor in extraction column 17. The aqueous re-extract containing trimethylolethane plus some impurities is continuously discharged from the lower portion 43 of column 37 through conduit 45 into the aqueous re-extract storage tank 46.

As the trimethylolethane is less soluble in the solvent than in the water, less water is fed to extraction column 37 than solvent extract. The ratio of water to solvent extract is influenced by many factors but, in general, the ratio is about the reverse of the ratio of solvent to water in extraction column 17. If the amount of water is too small, there will be a tendency for the amount of trimethylolethane and impurities to build up in the solvent and thereby reduce the amount of trimethylolethane extracted from the reaction liquor. If the amount of water is unduly increased, the cost of subsequently removing this water in the evaporator becomes undesirably high. Good results have been obtained when using from 0.4–0.7 part of water to 1 part by weight of solvent extract, with the best results being obtained in the range of 0.5–0.6 part of water to 1 part of solvent. However, other ratios of water to solvent extract may be used.

The aqueous re-extract is pumped from tank 46 through conduit 47 and dirt press 48, a filtering device for removing extraneous matter, and then to the evaporator feed tank 49 by means of pump 50. The aqueous re-extract is fed from tank 49 into evaporator 52 where the aqueous re-extract is concentrated under reduced pressure and, for example, pressures of 20–30 mm. absolute and a temperature in the range of 33–56° C. may be used for this purpose. The temperature will depend on the pressure and the degree of concentration. In the evaporator 52, the aqueous re-extract is concentrated to a specific gravity of 1.1.–1.125 at 35° C. which corresponds to a solids content of about 50 to 60% based on the total weight of the concentrated aqueous re-extract, the solids being trimethylolethane plus the impurities. If the concentrate is too highly concentrated, difficulties are encountered when crystallizing the trimethylolethane and the trimethylolethane will tend to contain too much impurities and the mother liquor will tend to solidify. The degree of concentration desired is primarily a matter of economy and purity. The evaporator is equipped with a condenser 53 for condensing the vapors of solvent and water. A small amount of solvent is dissolved during re-extraction. The condensed vapors are separated in separator 54 into an upper solvent phase and a lower water phase which may be discharged through conduit 55 to the sewer or other place of disposal. Solvent is discharged through conduit 56 into receiver 57 from which it may be returned to the solvent reservoir 10. Thus, the only solvent lost is the solvent dissolved in the aqueous raffinate discharged from extraction column 17.

When the aqueous re-extract has been sufficiently concentrated in evaporator 52, it is discharged into the crystallizer 59 where it is cooled slowly with agitation and then held at a fairly low temperature with agitation being continued to crystallize the trimethylolethane. The trimethylolethane slurry is then discharged into the centrifuge 60 and the crystals are separated from the mother liquor which is discharged through conduit 61 into tank 62. The wet centrifuge cake, which comprises trimethylolethane plus impurities, is washed with cold, fresh water to remove impurities. The wash water also dissolves an appreciable quantity of trimethylolethane and the wash water liquor formed in this manner is collected in tank 63. The mother liquor is pumped from tank 62 by pump 65 through conduit 66 and dirt press 67 to the evaporator feed tank 49. Wash water liquor is also pumped from tank 63 and through conduit 68 by pump 70 to dirt press 67 and evaporator feed tank 49. The dirt press 67 is a filtering device for removing extraneous matter. As shown, conduit 66 is provided with a valved branch 72 for discharging a small portion of the mother liquor to discharge tank 73.

The liquor in tanks 62 and 63 contains an appreciable quantity of trimethylolethane plus impurities. It has been found that if about 10 to 30% of this liquor is purged from the system, the remainder of all of the liquor may be recycled through the evaporator with additional aqueous re-extract to increase the over-all recovery from less than 50% to approximately 80%. The amount of liquor purged under any particular set of conditions depends upon the amount of impurities in the aqueous re-extract, which is in turn influenced by the amount of impurities in the feed liquor fed to extraction column 17. In the examples hereinafter set forth, 20% of the mother liquor separated from the crystalline product was purged. If desirable, this mother liquor may be combined with the wash water liquor and a 10–30% portion of this combined liquor purged before being recycled to the evaporator feed tank. Of course, the liquor may be recycled directly to the evaporator 52 instead of being indirectly recycled to the evaporator through evaporator feed tank 49.

The washed centrifuge cake is discharged into the dryer 75 where the product is heated to remove water. After drying, the anhydrous trimethylolethane may be ground in the pulverizer 76 and thereafter packaged in any suitable manner.

In the following Examples I through IV, the extractions are carried out in the manner generally describde hereinbefore. The solvent used, unless otherwise stated, was a mixture of primary and secondary amyl alcohols containing some tertiary amyl alcohol available on the market as "Pentasol"-27. All parts and percentages are by weight and the rates of feed are the average rates. As used herein, the term "amyl alcohol" is general to all alcohols of this group and mixtures thereof and is not limited to any particular amyl alcohol unless so stated.

EXAMPLE I

Trimethylolethane reaction liquor concentrated to a specific gravity of 1.18–1.2 at 25° C. was fed into the top of the first extraction column 17 at an average rate of flow of 921 parts per hour. Solvent was fed into the bottom of column 17 at a rate of 1907 parts per hour. The temperature in column 17 was about 70° C. The aqueous raffinate was continuously discharged from the bottom of column 17 at the rate of 607 parts per hour and the solvent extract was continuously discharged into the bottom of the second extraction column 37 at the rate of 2221 parts per hour. Fresh water was continuously fed down through column 37 at the rate of 1168 parts per hour. The extraction in column 37 was carried out at a temperature of about 25° C. The stripped solvent which overflowed from the top of column 37 at the rate of 1861 parts per hour was returned to the solvent feed reservoir 10. Aqueous re-extract was continuously discharged from the bottom of column 37 at the rate of 1509 parts per hour. This aqueous re-extract was collected in tank 46 and the trimethylolethane then recovered in the manner subsequently described.

EXAMPLE II

This extraction was carried out in manner similar to that described in Example I. The rate of flow per hour through extraction column 17 was 917 parts of reaction liquor and 1906 parts of solvent. The extraction in column 17 was conducted at room temperature (25° C.) and the raffinate was discharged at the rate of 658 parts per hour. The solvent extract from column 17 was pumped into the bottom of column 37 at the rate of 2165 parts per hour. The water flowed down through the column 37 at the rate of 1187 parts per hour. Stripped solvent was discharged from the top of the column and into reservoir 10 at the rate of 1816 parts per hour while aqueous re-extract was discharged from the bottom of column 37 into tank 46 at the rate of 1522 parts per hour. This aqueous re-extract also may be treated to recover the trimethylolethane in the manner described in Example V.

EXAMPLE III

The extractions in this example also were carried out in the manner described in Example I except that the solvent used was a high-grade fusel oil essentially consisting of isoamyl alcohol. The temperature in extraction column 17 was maintained at 70° C. while the temperature in column 37 was maintained at 25° C. The reaction liquor and solvent were fed to column 17 at the rate of 1076 parts and 2099 parts per hour, respectively. The raffinate was discharged from the bottom of column 17 at the rate of 614 parts per hour, while the solvent extract was discharged at the rate of 2520 parts per hour.

This solvent extract was pumped into extraction column 37 at the rate of 1946 parts per hour, while water was fed downwardly through the column at the rate of 995 parts per hour. The stripped solvent overflowed at the top of column 37 at the rate of 1654 parts per hour, while the aqueous re-extract was pumped to tank 46 at the rate of 1274 parts per hour. This aqueous re-extract may be treated and the trimethylolethane recovered in the manner described in Example V.

EXAMPLE IV

The extractions in this example were carried out in the manner described in Example I except that the reaction liquor was not concentrated and had a specific gravity in the range of 1.09–1.11 at 25° C. The reaction liquor was fed to extraction column 17 at an average rate of flow of 923 parts per hour, while the solvent was fed to the bottom of column 17 at the rate of 2094 parts per hour. Aqueous raffinate was discharged from the bottom of column 17 at the rate of 632 parts per hour, while solvent extract was fed from the top of the column to tank 23 at the rate of 2384 parts per hour. This solvent extract was pumped from tank 23 into the bottom of column 37 at the rate of 1757 parts per hour, while water was fed downwardly through the column at the rate of 962 parts per hour. Stripped solvent was withdrawn from the top of extraction column 37 at the rate of 1595 parts per hour, while the aqueous re-extract was discharged from the bottom of the column into tank 46 at the rate of 1123 parts per hour. This aqueous re-extract also may be evaporated and high-quality trimethylolethane recovered in the manner described in Example V.

In the foregoing Examples I to IV inclusive, the flow of materials into and out of columns 17 and 36 was continuous. If desirable, this flow may be intermittent while carrying out the process on an over-all continuous basis.

EXAMPLE V

The aqueous re-extracts obtained in any one of the foregoing examples may be utilized in this procedure. The quantities of aqueous re-extract indicated in Table I were successively discharged into the evaporator 52 and evaporated at a pressure of 20–30 mm. of mercury at temperatures from 33–56° C. In each case, the aqueous re-extract was concentrated to approximatley 55% solids based on the total solids content. After concentration, the quantity of concentrated extract was transferred to the crystallizer 59 which was equipped with an agitator and cooled at the following rate:

To 30° C. in 30 minutes
From 30° C. to 25° C. in 30 minutes
From 25° C. to 20° C. in 30 minutes
From 20° C. to 15° C. in 30 minutes
From 15° C. to crystallization point (6–12° C.)

When crystallization occurred, there was a rapid development of heat (heat of crystallization) and external cooling was necessary to cool the slurry to 15° C. The slurry was held at 15° C. with agitation for 2 hours and then transferred to the centrifuge 60 where the slurry was centrifuged and the mother liquor was collected in tank 62. The centrifuge cake was washed with cold, fresh water at a temperature of 10° C. The wash water was directed against the cake in a fine stream. The wash water liquor was separated from the crystals by centrifuging and collected in tank 63. In each instance, execept Run No. 1, 20% of the mother liquor was discarded and all of the liquor except for this discard was recycled back to the evaporator feed tank 49 to form, with additional aqueous re-extract, the feed for evaporator 52. No mother liquor was purged during the first run, as no recycled liquor was used and equilibrium was obtained more rapidly in this manner. From Table I it can be seen that recycling about 80% of all of the liquor (mother liquor plus wash water liquor) produces trimethylolethane of very high quality and the over-all yield in this series of 12 runs was 73.4% and the average individual yield at equilibrium was 78.7%.

Trimethylolethane was recovered from the purged mother liquor but this product was much poorer in quality and had a sodium formate content of 0.35% and a melting point of 189.2–196.2° C. This material could be used to enrich the evaporator or column feed liquor to further increase the over-all yield by about 2 to 3%.

extracting trimethylolethane from the solvent extract with water, thereby forming an aqueous re-extract containing trimethylolethane, and thereafter separating trimethylolethane from the aqueous re-extract.

2. The process of recovering trimethylolethane from an aqueous liquor containing trimethylolethane and impurities, including sodium formate, resulting from condensing formaldehyde with propionaldehyde in an aqueous medium containing sodium hydroxide, the process comprising the steps of extracting trimethylolethane from a quantity of such an aqueous liquor with a larger quantity of amyl alcohol, thereby obtaining a quantity of amyl alcohol extract containing trimethylolethane, extracting trimethylolethane from the said quantity of amyl alcohol extract with a smaller quantity of water thereby obtaining an aqueous re-extract containing trimethylolethane, and thereafter crystallizing trimethylolethane from the aqueous re-extract.

3. In the process of continuously recovering trimethylolethane from an aqueous liquor containing trimethylolethane and impurities including sodium formate, resulting from condensing formaldehyde with propionaldehyde in an aqueous medium containing sodium hydroxide, the steps comprising continuously contacting such an

TABLE I

| Run No. | Recycle from run No. | Wt. of aqueous extract fed to evaporator (gms.) | Wt. of mother liquor and wash water recycled from previous run (gms.) | Wt. of concentrate (gms.) | Sp. gr. of concentrate at 35° C. | Wt. of mother liquor (gms.) | Wt. of mother liquor removed as purge (gms.) | Ml. cold water used for wash | Wt. of wash water liquor (gms.) | Total wt. of liquor recycled to next run | Trimethylolethane yield | | | | | | Trimethylolethane analysis | |
|---|---|---|---|---|---|---|---|---|---|---|---|---|---|---|---|---|---|---|
| | | | | | | | | | | | On individual run | | | Cumulative | | | | |
| | | | | | | | | | | | Theoret. (gms.) | Actual (gms.) | Percent | Theoret. (gms.) | Actual (gms.) | Percent | Percent sodium formate | Melting point, °C. |
| 1 | | 1,800 | 0 | 648.0 | 1.100 | 299.3 | 0 | 180 | 253.4 | 543.7 | 362 | 161.8 | 44.7 | 362 | 161.8 | 44.7 | 0.083 | 200.8–202 |
| 2 | 1 | 900 | 543.7 | 648.0 | 1.106 | 314.0 | 62.8 | 170 | 263.7 | 514.9 | 181 | 137.8 | 75.8 | 543 | 299.6 | 55.1 | 0.035 | 201.2–202 |
| 3 | 2 | 900 | 514.9 | 648.0 | 1.108 | 311.8 | 62.4 | 170 | 246.1 | 495.5 | 181 | 147.5 | 81.5 | 724 | 447.1 | 61.7 | 0.062 | 200.0–202.0 |
| 4 | 3 | 900 | 495.5 | 648.0 | 1.108 | 314.0 | 62.8 | 170 | 248.1 | 499.3 | 181 | 147.5 | 81.5 | 905 | 594.6 | 65.7 | 0.062 | 200.5–202.0 |
| 5 | 4 | 900 | 499.3 | 648.0 | 1.108 | 336.0 | 67.2 | 160 | 243.5 | 512.3 | 181 | 128.3 | 71.0 | 1,086 | 722.9 | 66.6 | 0.09 | 200.2–201.8 |
| 6 | 5 | 900 | 512.3 | 648.0 | 1.111 | 338.0 | 67.6 | 155 | 232.7 | 502.1 | 181 | 136.7 | 75.5 | 1,267 | 859.6 | 67.9 | 0.09 | 200.0–201.8 |
| 7 | 6 | 900 | 502.1 | 648.0 | 1.115 | 326.0 | 65.2 | 160 | 247.0 | 507.8 | 181 | 136.5 | 75.4 | 1,448 | 996.1 | 68.9 | 0.10 | 199.5–201.5 |
| 8 | 7 | 900 | 507.8 | 648.0 | 1.117 | 311.5 | 62.3 | 170 | 265.0 | 514.2 | 181 | 140.3 | 77.5 | 1,629 | 1,136.4 | 69.8 | 0.097 | 200.1–201.5 |
| 9 | 8 | 900 | 514.2 | 648.0 | 1.120 | 299.2 | 59.8 | 175 | 261.1 | 500.5 | 184 | 153.5 | 83.4 | 1,813 | 1,289.9 | 71.0 | 0.083 | 200.3–202.0 |
| 10 | 9 | 900 | 500.5 | 648.0 | 1.117 | 335.0 | 67.0 | 160 | 242.3 | 510.3 | 184 | 129.3 | 70.4 | 1,997 | 1,419.2 | 71.0 | 0.11 | 199.5–201.2 |
| 11 | 10 | 900 | 510.3 | 648.0 | 1.119 | 274.0 | 54.9 | 190 | 288.3 | 507.9 | 184 | 158.0 | 86.0 | 2,181 | 1,577.2 | 72.1 | 0.083 | 200.0–201.0 |
| 12 | 11 | 900 | 507.9 | 648.0 | 1.118 | 286.5 | 57.4 | 185 | 271.0 | 500.1 | 184 | 159.7 | 86.7 | 2,365 | 1,736.9 | 73.4 | 0.09 | 200.2–201.9 |

As described herein, the trimethylolethane present in the solvent extract is dissolved in water and the solvent is removed for recycling by extraction with water and the formation of aqueous and solvent layers which are readily separated. While this is the preferred procedure, other methods may be used for simultaneously or successively removing the solvent and dissolving the trimethylolethane in water to form an aqueous trimethylolethane solution from which the trimethylolethane can be recovered in a pure condition. For example, water may be added to the solvent extract and the mixture subjected to azeotropic distillation to remove the solvent. The water removed by distillation or fresh water may be added to the mixture so that after the solvent has been removed, there is an aqueous solution of trimethylolethane. The trimethylolethane can be recovered from this aqueous solution in the manner previously described.

We claim:

1. The process of recovering trimethylolethane from an aqueous solution containing trimethylolethane impurities, including alkali metal formate and organic impurities, resulting from condensing formaldehyde with propionaldehyde in an aqueous medium containing alkali metal hydroxide, the process comprising the steps of extracting trimethylolethane from such an aqueous solution with a solvent selected from the group consisting of amyl alcohol, normal butanol and mixtures thereof, thereby forming a solvent extract containing trimethylolethane, aqueous liquor with solvent in a first extraction zone thereby forming a lower aqueous raffinate phase and an upper solvent extract phase containing trimethylolethane, the solvent being selected from the group consisting of amyl alcohol, normal butanol and mixtures thereof, separately removing solvent extract and aqueous raffinate from the first extraction zone, continuously contacting the removed solvent extract with water in a second extraction zone to extract trimethylolethane into the water from the solvent thereby forming an upper solvent phase and a lower aqueous re-extract phase containing trimethylolethane, continuously separately removing the solvent and aqueous re-extract from the second extraction zone, returning the removed solvent to the first extraction zone for extracting trimethylolethane from a further quantity of such aqueous liquor, and crystallizing trimethylolethane from the aqueous re-extract.

4. In the process of continuously recovering trimethylolethane from an aqueous liquor containing trimethylolethane and impurities including sodium formate, resulting from condensing formaldehyde with propionaldehyde in an aqueous medium containing sodium hydroxide, the steps comprising continuously contacting such an aqueous liquor with solvent in a first extraction zone thereby forming a lower aqueous raffinate phase and an upper solvent extract phase containing trimethylolethane, the solvent being selected from the group consisting of amyl alcohol, normal butanol and mixtures thereof, separately removing solvent extract and aqueous raffinate from the first extraction zone, continuously contacting the removed solvent extract with water in a second extraction zone to extract trimethylolethane into the water from the solvent thereby forming an upper solvent phase and a lower aqueous re-extract phase containing trimethylolethane, continuously separately removing the solvent and aqueous re-extract from the second extraction zone, returning the removed solvent to the first extraction zone for extracting trimethylolethane from a further quantity of such aqueous liquor, concentrating the aqueous re-extract in a concentration zone, cooling the concentrated aqueous re-extract and forming crystalline trimethylolethane in aqueous mother liquor containing dissolved trimethylolethane and impurities separating the crystalline trimethylolethane from the aqueous mother liquor and returning at least a major portion of the aqueous mother liquor to the concentration zone, along with additional aqueous re-extract.

5. In the process of continuously recovering trimethylolethane from an aqueous reaction liquor containing trimethylolethane and impurities resulting from condensing formaldehyde with propionaldehyde in an aqueous medium containing sodium hydroxide, said reaction liquor having a specific gravity within the range of 1.15–1.22 at 25° C., the process comprising the steps of continuously contacting such a reaction liquor with solvent in a first extraction zone thereby forming a lower aqueous raffinate phase and an upper solvent extract phase containing trimethylolethane, the solvent being selected from the group consisting of amyl alcohol, normal butanol and mixtures thereof and the amount of solvent being within the range of 1.5–2.5 parts by weight of solvent to each part by weight of reaction liquor, separately removing solvent extract and aqueous raffinate from the first extraction zone, continuously contacting the removed solvent extract with from 0.4 to 0.7 part of water per part by weight of solvent extract in a second extraction zone to extract trimethylolethane from the solvent into the water and thereby forming an upper solvent phase and a lower aqueous re-extract phase containing trimethylolethane, continuously separately removing solvent and aqueous re-extract from the second extraction zone, returning the removed solvent to the first extraction zone, concentrating the aqueous re-extract unitl it contains from 50 to 60% by weight of dissolved trimethylolethane plus impurities, cooling the concentrated aqueous re-extract and forming crystalline trimethylolethane in aqueous mother liquor containing dissolved trimethylolethane and impurities, separating the trimethylolethane from the aqueous mother liquor, washing the separated trimethylolethane with water, the wash water removing impurities and dissolving some of the trimethylolethane to form aqueous wash water liquor containing trimethylolethane and impurities, separating the washed trimethylolethane and aqueous wash water liquor, mixing from 70 to 90% of all of the aqueous mother liquor and wash water liquor with additional aqueous re-extract and concentrating and recovering trimethylolethane from this last mentioned mixture.

6. In the process of continuously recovering trimethylolethane from a concentrated aqueous reaction liquor having a specific gravity within the range of 1.18–1.2 at 25° C. and resulting from condensing approximately 3 moles of formaldehyde with 1 mole of propionaldehyde in an aqueous medium containing approximately 1 mole of sodium hydroxide, the steps comprising passing a quantity of such a concentrated reaction liquor into contact with a quantity of amyl alcohol in a first extraction zone, the quantity of amyl alcohol being in the range of 1.9–2.2 parts per part by weight of concentrated reaction liquor forming in the first extraction zone a lower aqueous raffinate and an upper amyl alcohol extract containing trimethylolethane, separately removing amyl alcohol extract and aqueous raffinate from the first reaction zone, continuously contacting the removed amyl alcohol extract with a quantity of fresh water in a second extraction zone to extract trimethylolethane into the water from the amyl alcohol, thereby forming an upper amyl alcohol layer and a lower aqueous re-extract layer containing trimethylolethane, the ratio of water to amyl alcohol extract being within the range of 0.4–0.7 part of water per part by weight of amyl alcohol extract, continuously separately removing amyl alcohol and aqueous re-extract from the second extraction zone, returning the removed amyl alcohol to the first extraction zone and extracting trimethylolethane from a further quantity of concentrated reaction liquor, concentrating the removed aqueous re-extract at an elevated temperature, cooling the concentrated aqueous re-extract and forming crystalline trimethylolethane and aqueous mother liquor containing dissolved impurities and trimethylolethane, separating the crystalline trimethylolethane from the aqueous mother liquor, washing the separated crystalline trimethylolethane with cold fresh wash water and recovering purified trimethylolethane from the wash water, combining the wash water with about 80% of the mother liquor and mixing the combined wash water and mother liquor with a new portion of aqueous re-extract.

7. In the process of recovering trimethylolethane from aqueous reaction liquors produced by condensing formaldehyde and propionaldehyde in an aqueous medium containing sodium hydroxide, the reaction liquor containing trimethylolethane, sodium formate and other impurities, the process comprising the steps of concentrating such a reaction liquor and precipitating part of the sodium formate, separating the precipitated sodium formate from the concentrated reaction liquor, then extracting the trimethylolethane from the reaction liquor from which part of the sodium formate has been separated with a solvent selected from the group consisting of amyl alcohols, normal butanol and mixtures thereof and forming trimethylolethane solvent extract, extracting trimethylolethane from the trimethylolethane solvent extract with water and forming a trimethylolethane aqueous re-extract, recycling the stripped solvent and extracting trimethylolethane from a further quantity of reaction liquor, crystallizing trimethylolethane from the aqueous re-extract, and mixing the stripped aqueous re-extract with additional aqueous re-extract, for the purpose of isolating more trimethylolethane.

References Cited in the file of this patent

UNITED STATES PATENTS

| 2,400,724 | Walker | May 21, 1946 |
| 2,479,041 | Elgin | Aug. 16, 1949 |

FOREIGN PATENTS

| 108,236 | Australia | Aug. 24, 1939 |